United States Patent
Nahum

(10) Patent No.: US 10,527,397 B2
(45) Date of Patent: Jan. 7, 2020

(54) COOPERATIVE MEASUREMENT GAUGE SYSTEM FOR MULTIPLE AXIS POSITION MEASUREMENT

(71) Applicant: Mitutoyo Corporation, Kawasaki-shi, Kanagawa-ken (JP)

(72) Inventor: Michael Nahum, Kirkland, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 215 days.

(21) Appl. No.: 15/855,805

(22) Filed: Dec. 27, 2017

(65) Prior Publication Data

US 2019/0195607 A1 Jun. 27, 2019

(51) Int. Cl.
*G01B 3/22* (2006.01)
(52) U.S. Cl.
CPC ...................... *G01B 3/22* (2013.01)
(58) Field of Classification Search
CPC .......... G01B 11/002; G01B 3/18; G01B 11/14
USPC .......................................................... 33/504
See application file for complete search history.

(56) References Cited

U.S. PATENT DOCUMENTS

| 4,679,326 | A | | 7/1987 | Takizawa et al. |
| 4,930,096 | A | | 5/1990 | Shimizu et al. |
| 5,959,200 | A | | 9/1999 | Chui et al. |
| 5,966,681 | A | * | 10/1999 | Bernhardt ............ G01B 3/008 33/503 |
| 6,154,713 | A | * | 11/2000 | Peter .................. G01B 21/04 33/504 |
| 6,229,297 | B1 | * | 5/2001 | Bohn ................... H04N 1/047 324/160 |
| 6,502,057 | B1 | | 12/2002 | Suzuki |
| 7,596,990 | B2 | | 10/2009 | Su et al. |
| 7,797,849 | B2 | * | 9/2010 | Gomez ................ G01B 5/14 33/503 |
| 8,978,263 | B2 | | 3/2015 | Nahum et al. |
| 9,640,043 | B1 | | 5/2017 | Dockrey et al. |

(Continued)

OTHER PUBLICATIONS

Mitutoyo America Corporation, "2D Image Correlation Encoder MICSYS," Bulletin No. 2029, Jul. 2013. (4 pages).

*Primary Examiner* — Yaritza Guadalupe-McCall
(74) *Attorney, Agent, or Firm* — Seed IP Law Group LLP

(57) ABSTRACT

A first position measurement device ("FPMD") is configured to control and operate both standalone and combined device operating modes. During the combined device operating mode, the FPMD inputs second-device measurement sample outputs provided by a second position measurement device ("SPMD") via an inter-device communication connection. The FPMD and the SPMD are held in a fixed relationship in a workpiece measurement arrangement (e.g., with transverse measuring axes). Concurrent measurement data sets are determined as including at least a first-device measurement sample output from the FPMD and a second-device measurement sample output from the SPMD corresponding to concurrent first-device and second-device sample periods. Each concurrent measurement data set is associated with a corresponding measurement sample region on the workpiece. A combined measurement data output (e.g., as output and/or displayed by the FPMD) is provided for the current measurement sample region on the workpiece based on the corresponding concurrent measurement data set.

22 Claims, 8 Drawing Sheets

(56) References Cited

U.S. PATENT DOCUMENTS

| | | | |
|---|---|---|---|
| 2011/0167657 A1* | 7/2011 | Eaton | G01B 21/04 |
| | | | 33/503 |
| 2013/0018575 A1 | 1/2013 | Birken et al. | |
| 2015/0097671 A1 | 4/2015 | Laflen et al. | |
| 2015/0177729 A1 | 6/2015 | Atherton | |
| 2015/0247745 A1 | 9/2015 | McClogan | |
| 2017/0110007 A1 | 4/2017 | Nahum | |
| 2017/0176226 A1 | 6/2017 | Dockrey | |
| 2018/0106595 A1* | 4/2018 | Christoph | G01B 5/012 |
| 2019/0137890 A1* | 5/2019 | Ikkink | G01B 9/0201 |
| 2019/0195607 A1* | 6/2019 | Nahum | G01B 3/22 |
| 2019/0204180 A1* | 7/2019 | Medvedyeva | G01B 11/002 |

* cited by examiner

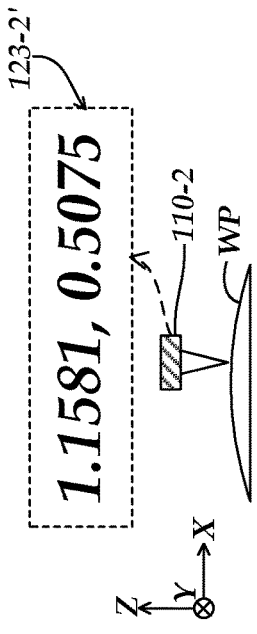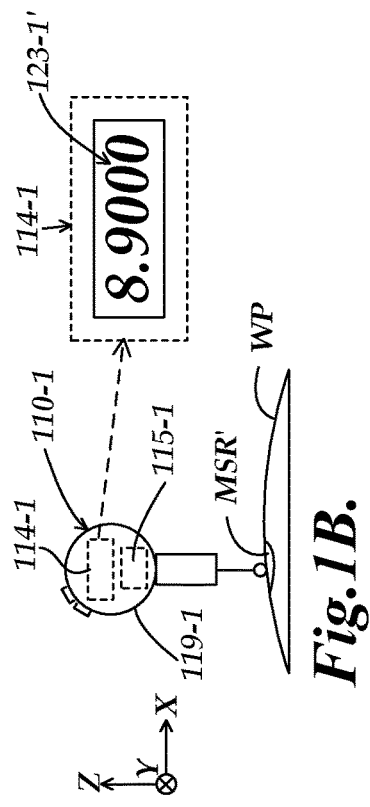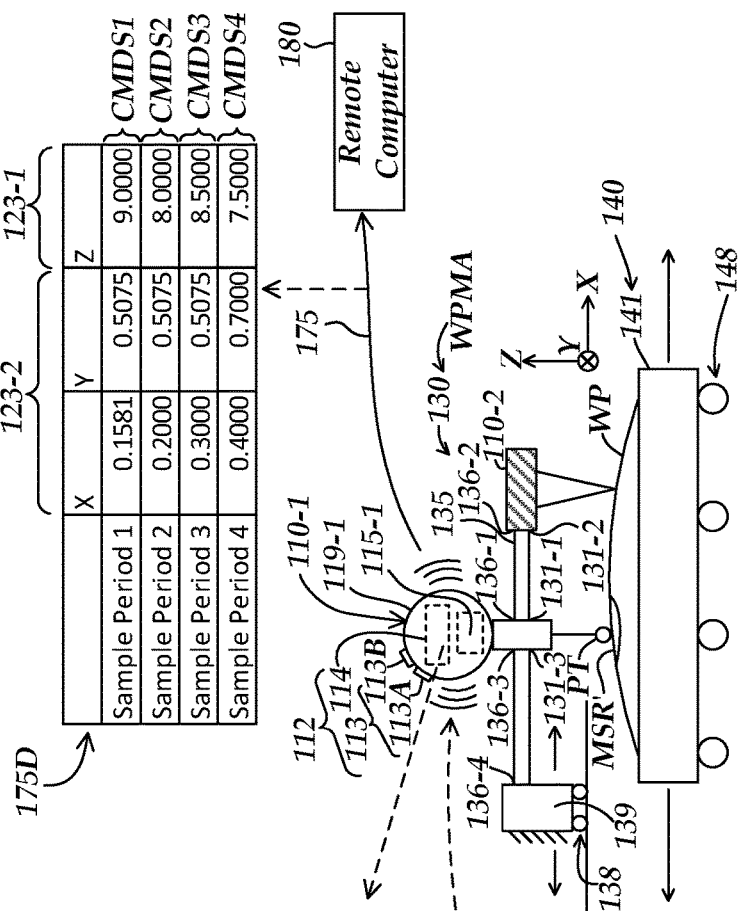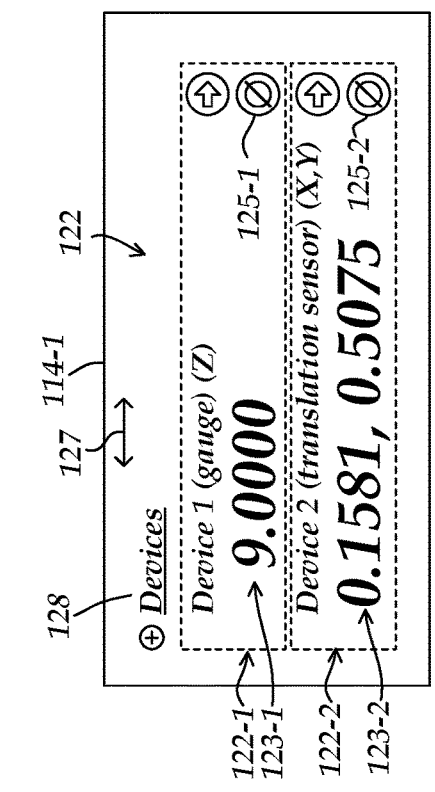

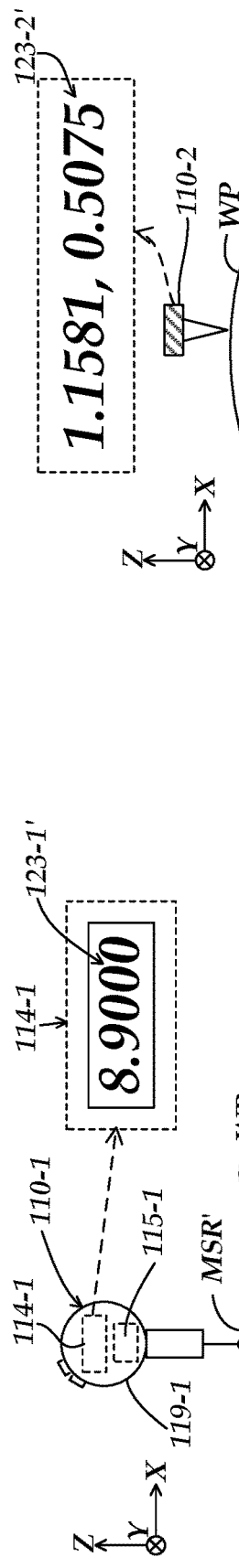
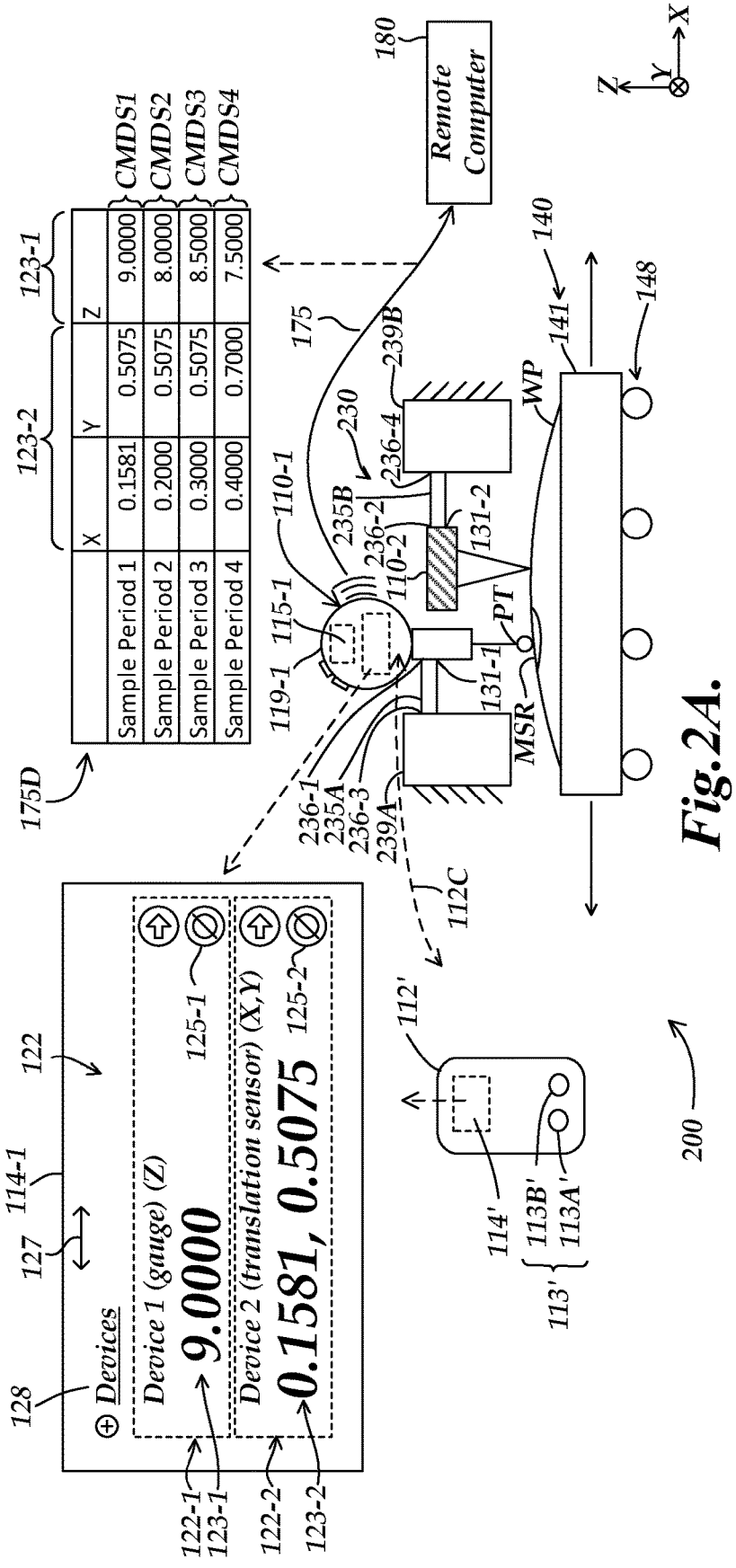
Fig.2A. Fig.2B. Fig.2C.

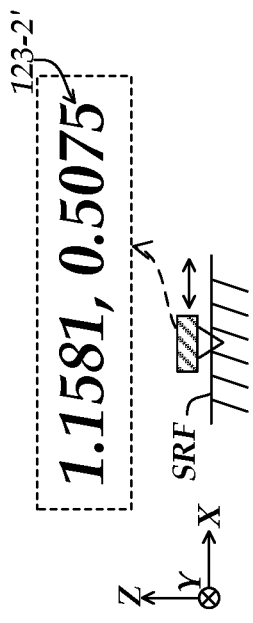
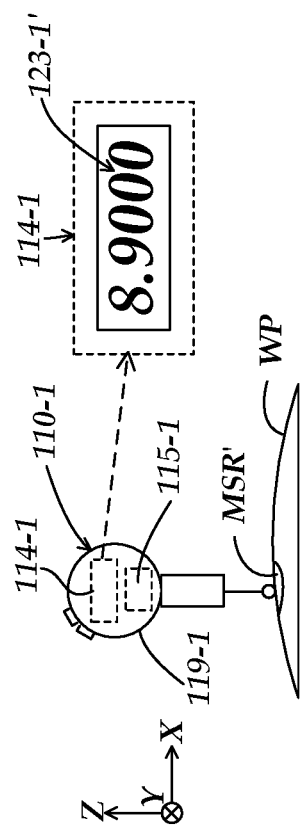
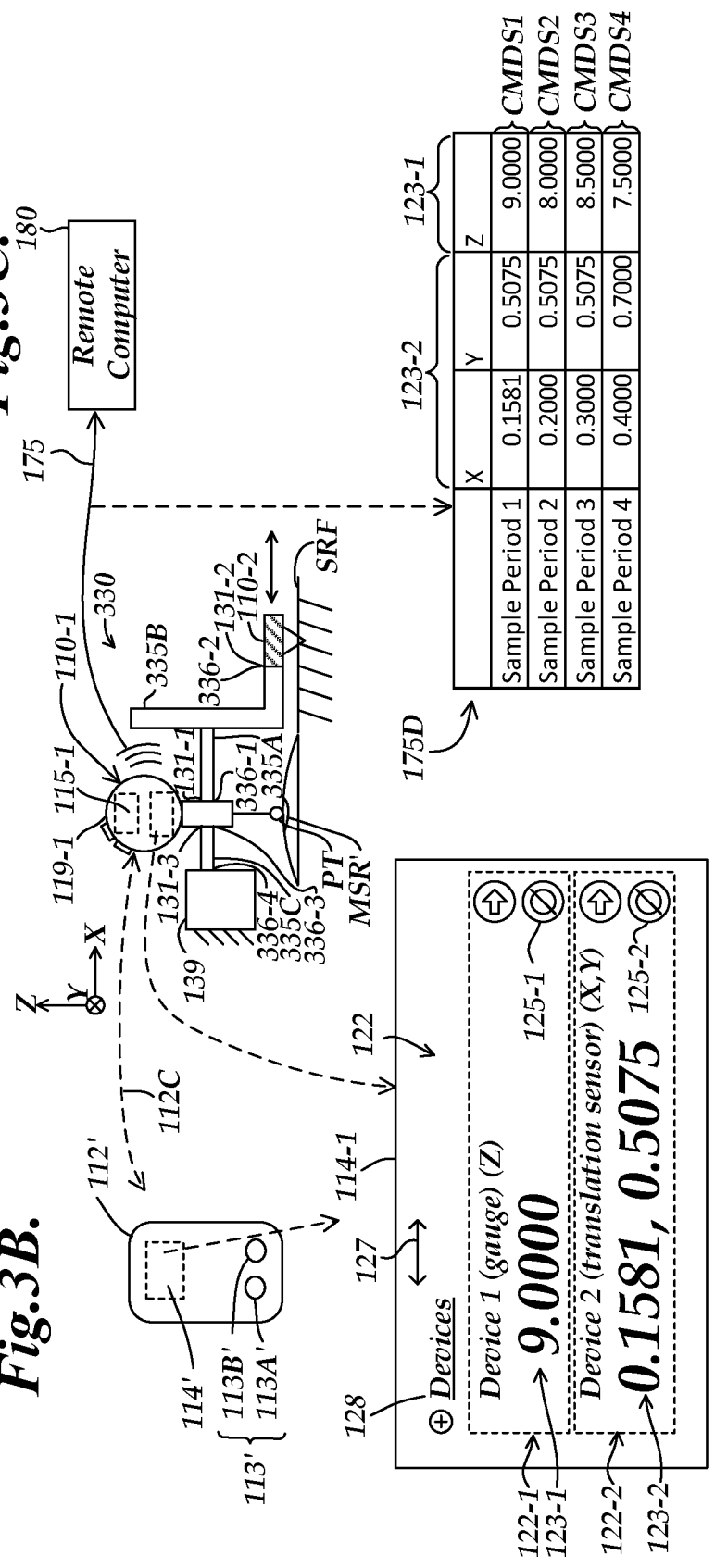

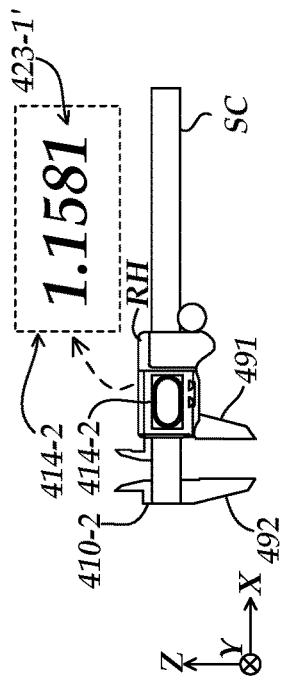
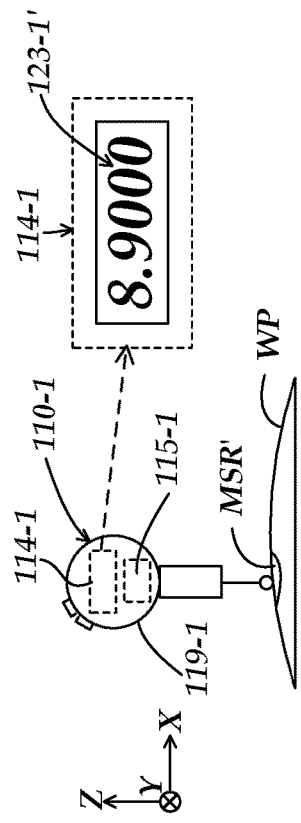
Fig.4B.
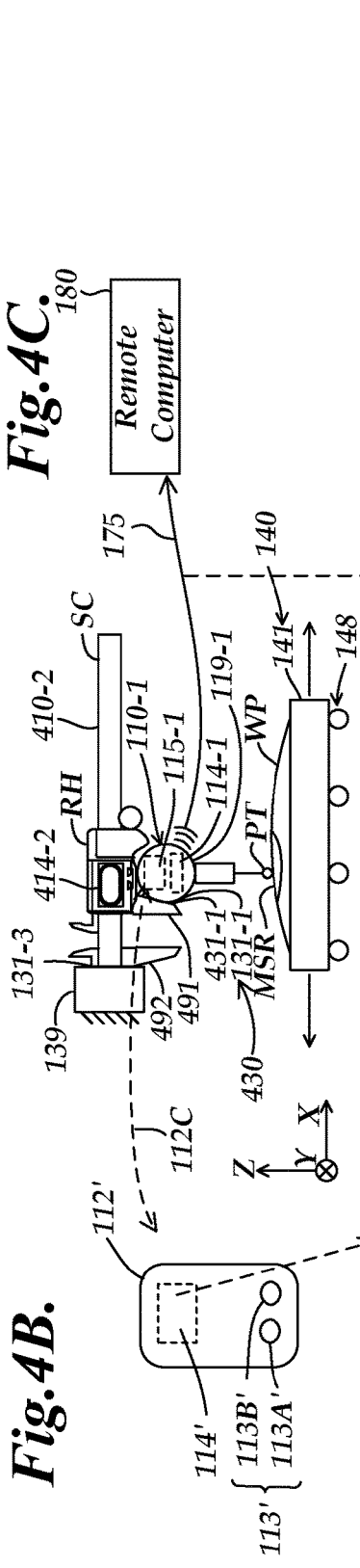
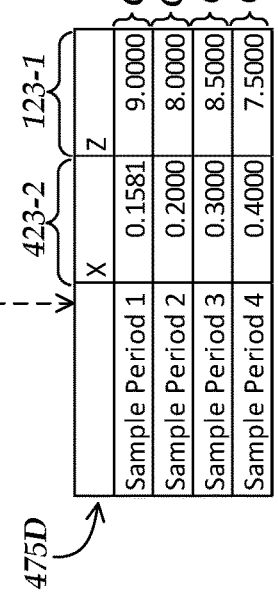
Fig.4C.
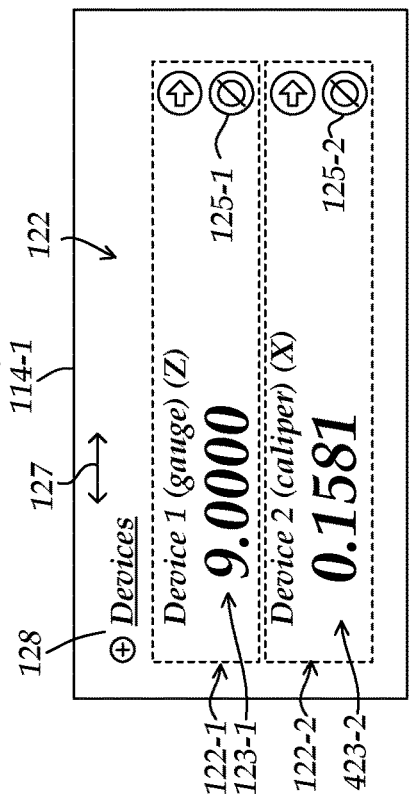
Fig.4A.

Fig. 5A.

| | 575D | | 123-2 | | 523-1 | |
|---|---|---|---|---|---|---|
| | X1 | Y | Z | X2 | X1+X2 | |
| Sample Period 1 | 0.1581 | 0.5075 | 9.0000 | 0.0020 | 0.1601 | CMDS1 |
| Sample Period 2 | 0.2000 | 0.5075 | 8.0000 | 0.0030 | 0.2030 | CMDS2 |
| Sample Period 3 | 0.3000 | 0.5075 | 8.5000 | 0.0040 | 0.3040 | CMDS3 |
| Sample Period 4 | 0.4000 | 0.7000 | 7.5000 | 0.0050 | 0.4050 | CMDS4 |

Fig. 5B.   8.9000, 0.0020

Fig. 5C.   1.1581, 0.5075

COOPERATIVE MEASUREMENT GAUGE SYSTEM FOR MULTIPLE AXIS POSITION MEASUREMENT

BACKGROUND

Technical Field

This disclosure relates to precision metrology, and more particularly to a system including position measurement devices configured to produce measurement values.

Description of the Related Art

Various manufacturing devices such as milling machines or lathes are equipped with measurement gauges such as linear scales or other position measurement devices for measuring a position of a machine tool or a workpiece. For example, Mitutoyo model AT116 or AT715 linear scales may be configured to detect an absolute position using inductive sensing and output a signal indicative of the absolute position. Such linear scales may be configured to communicate position measurements through a digital read out (DRO) system. A typical DRO system may include a digital display to show the measured position. For example, a Mitutoyo KA Counter system may be configured as part of a DRO package to display a position of a linear scale coupled with a milling machine or a lathe.

Various other types of measurement gauges are also available, such as handheld or portable position measurement devices (e.g., calipers, micrometers, digital "dial" indicators, etc.) which may be configured, for example, to output measurement data to an external computer. The data may be output through wired systems such as RS-232C communication, or wireless systems utilizing Bluetooth or other wireless communication technology. For example, a caliper such as a Mitutoyo ABS Digimatic Caliper model CD-15CX may use Mitutoyo U-WAVE wireless data communication to communicate with a computer configured with Mitutoyo MeasurLink software. Wireless connectivity may be provided by an external transmitter unit attached to a handheld or portable position measurement device. Examples of such systems are disclosed in U.S. Pat. Nos. 4,930,096 and 6,502,057.

In various applications, it may be desirable to have improved capabilities and/or modes for communicating and/or displaying measurement values from position measurement devices in order to provide additional convenience, speed and flexibility to an operator to set up a measurement system (e.g., for performing dimensional verification while manufacturing a workpiece), particularly when combining existing types of "standalone" measuring devices to provide more complex or comprehensive measurement of a workpiece.

BRIEF SUMMARY

This summary is provided to introduce a selection of concepts in a simplified form that are further described below in the Detailed Description. The summary is not intended to identify key features of the claimed subject matter, nor is it intended to be used as an aid in determining the scope of the claimed subject matter.

A first position measurement device ("FPMD") is provided including a first position sensor housed in a first device housing, and a first signal processing and control portion housed in the first device housing. The first position sensor is configured to provide first-device measurement sample outputs indicative of a workpiece surface coordinate measurement relative to the FPMD along a first measuring axis, for corresponding measurement sample regions on a workpiece during a corresponding first-device sample period. The first signal processing and control portion includes a first measurement sample association portion that is utilized to implement a combined device operating mode. The FPMD is configured to operate in a standalone operating mode during a standalone operating period and the combined device operating mode during a combined device operating period.

The combined device operating mode may begin with an establishing of an inter-device communication connection with a second position measurement device ("SPMD"). In various implementations, the SPMD includes a second position sensor configured to provide second-device measurement sample outputs indicative of a workpiece surface coordinate measurement relative to the SPMD along a second measuring axis, for corresponding measurement sample regions on a workpiece during a corresponding second-device sample period. In various implementations, the combined device operating mode is usable when the FPMD and the SPMD are held in a fixed relationship in a workpiece measurement arrangement with the first measuring axis and the second measuring axis arranged in a fixed axis relationship.

The combined device operating mode includes inputting the first-device measurement sample outputs provided by the first position sensor and inputting the second-device measurement sample outputs provided by the SPMD via the inter-device communication connection. Concurrent measurement data sets are determined as including at least a first-device measurement sample output and a second-device measurement sample output corresponding to concurrent first-device and second-device sample periods. Each concurrent measurement data set is associated with a corresponding measurement sample region on the workpiece. A combined measurement data output is provided for the current measurement sample region on the workpiece based on the corresponding concurrent measurement data set.

In contrast to the combined device operating mode, the standalone operating mode of the FPMD does not include establishing an inter-device communication connection with a second position measurement device SPMD. During the standalone operating mode, a standalone measurement data output is provided including a workpiece surface coordinate measurement relative to the FPMD along the first measuring axis for a current measurement sample region on a workpiece.

In some implementations, the FPMD may further comprise a first user interface comprising first-device control elements and a first-device display that are connected to exchange signals with the first signal processing and control portion. In some such implementations, the first-device control elements and the first-device display are included in the first device housing (e.g., as in a digital dial gauge, or a digital height gauge, or the like.) In some implementations, the first-device display is controlled by the first signal processing and control portion, and during the standalone operating mode only a single axis coordinate measurement is displayed on the first-device display, and during the combined device operating mode a combined mode display format on the first-device display displays two axis coordinate measurements.

In various applications, the various features outlined above may considerably reduce or simplify the hardware and/or software components, and/or the system configuration effort, required by user in order to assemble various standalone-capable devices into an integrated measurement system. That is, devices heretofore optimized to provide "standalone" measurements for a workpiece may be easily integrated to form a measurement system for providing a more complex or comprehensive combination of measurements for a workpiece, by relying on a combined device operating mode that is built into, and always available in, the FPMD. A relatively unskilled user may assemble such a system without the inconvenience, complexity and expense associated with using an additional computer or software system, if desired.

BRIEF DESCRIPTION OF THE DRAWINGS

FIGS. 1A-1C are diagrams of a first exemplary implementation of a dimensional metrology measurement system.
FIGS. 2A-2C are diagrams of a second exemplary implementation of a dimensional metrology measurement system.
FIGS. 3A-3C are diagrams of a third exemplary implementation of a dimensional metrology measurement system.
FIGS. 4A-4C are diagrams of a fourth exemplary implementation of a dimensional metrology measurement system.
FIGS. 5A-5C are diagrams of a fifth exemplary implementation of a dimensional metrology measurement system.

DETAILED DESCRIPTION

Figure 6:
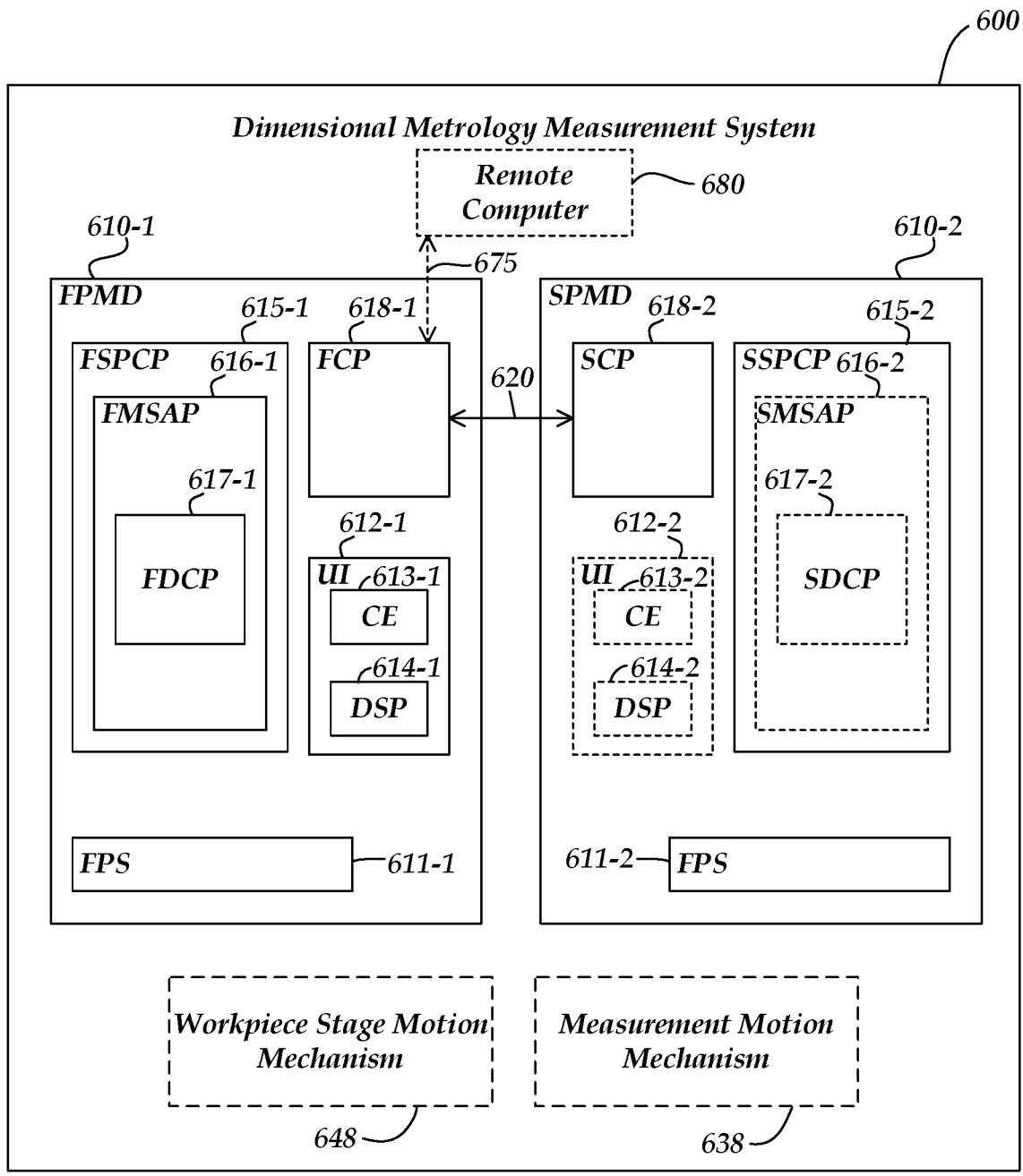
FIG. 6 is a block diagram of first and second position measurement devices as included in a dimensional metrology measurement system.

FIGS. 1A-1C are diagrams of a first exemplary implementation of a dimensional metrology measurement system 100. As shown in FIG. 1A, the dimensional metrology measurement system 100 has system members including a first position measurement device ("FPMD") 110-1 and a second position measurement device ("SPMD") 110-2. In the example of FIG. 1A, the FPMD 110-1 operates in a combined device operating mode with the SPMD 110-2, and in the examples of FIGS. 1B and 1C, the FPMD 110-1 and the SPMD 110-2 operate in standalone operating modes, respectively.

As will be described in more detail below with respect to FIG. 6, in various implementations the FPMD 110-1 and the SPMD 110-2 each include a position sensor. In the example of FIG. 1A, the FPMD 110-1 (e.g., comprising a dial indicator) includes a first position sensor and a first signal processing and control portion 115-1 that are each included in or housed in a first device housing 119-1. The first position sensor is configured to provide first-device measurement sample outputs indicative of workpiece surface coordinate measurements relative to the FPMD 110-1 along at least a first measuring axis (e.g., along the Z axis in the example of FIG. 1A), for corresponding measurement sample regions MSR on a workpiece WP during corresponding first-device sample periods. In one example implementation, the sensor of the FPMD 110-1 may be coupled to a probe with a probe tip PT that moves along the surface of the workpiece WP, as will be understood by one skilled in the art. The SPMD 110-2 (e.g., comprising a translation sensor, such as an image correlation sensor or a non-contact sensor) includes a second position sensor configured to provide second-device measurement sample outputs indicative of workpiece surface coordinate measurements relative to the SPMD 110-2 along at least a second measuring axis (e.g., along the X and Y axes in the example of FIG. 1A), for corresponding measurement sample regions MSR on the workpiece WP during corresponding second-device sample periods.

As will be described in more detail below, a combined device operating mode may include the FPMD 110-1 establishing an inter-device communication connection with the SPMD 110-2, which enables the FPMD 110-1 to display or otherwise provide a combined measurement data output (i.e., including measurement data from both devices). In various implementations, the combined device operating mode is usable when the FPMD 110-1 and the SPMD 110-2 are held in a fixed relationship in a workpiece measurement arrangement WPMA with at least the first measuring axis of the FPMD 110-1 (e.g., along the Z axis) and at least the second measuring axis of the SPMD 110-2 (e.g., along the X or Y axis) arranged in a fixed axis relationship. In various implementations, as part of a mounting arrangement 130, the FPMD 110-1 includes a first mounting portion 131-1 for mechanically coupling to a first coupling portion 136-1 of a mounting device 135, wherein the mounting device 135 also includes a second coupling portion 136-2 for mechanically coupling to a second mounting portion 131-2 of the SPMD 110-2. In the example of FIG. 1A, the mounting device 135 also includes a third coupling portion 136-3 for mechanically coupling to a third coupling portion 131-3 of the FPMD 110-1. In various implementations, the mounting device 135 may fix the orientation of the FPMD 110-1 relative to the orientation of the SPMD 110-2 such that the first measuring axis (e.g., along the Z axis) is transverse to the second measuring axis (e.g., along the X axis or the Y axis) according to the fixed axis relationship.

In various implementations, the FPMD 110-1, the SPMD 110-2 and the mounting arrangement 130 are arranged relative to the workpiece WP in the workpiece measurement arrangement WPMA that is operable to provide workpiece surface coordinate measurements for a plurality of measurement sample regions MSR on the workpiece WP. For example, in one implementation the mounting device 135 may further include a fourth coupling portion 136-4 for coupling to a support element 139 (e.g., as part of a support structure or other mechanism that holds the mounting device 135, the FPMD 110-1 and the SPMD 110-2 at a position above or otherwise relative to the workpiece WP and/or workpiece stage 141, etc.). In various implementations, a workpiece stage configuration 140 may include the workpiece stage 141 and a workpiece stage motion mechanism 148, and the support element 139 may be fixed at a specified location such that any relative movement between the workpiece WP and the mounting arrangement 130 is provided by operation of the workpiece stage motion mechanism 148. For example, the workpiece stage motion mechanism 148 (e.g., including rollers or other movement mechanisms) may enable movement of the workpiece stage 141 along x- and y-axes that lie in a plane that is generally parallel to the surface of the workpiece stage 141 where the workpiece WP is positioned. In various implementations, the mounting arrangement 130 may alternatively or also include a measurement motion mechanism 138 that enables movement of the mounting arrangement 130 (e.g., along x- and y-axes that lie in a plane that is generally parallel to the surface of the workpiece stage 141 where the workpiece WP is positioned). It will be appreciated that the movement of the mounting arrangement 130 relative to the surface of the workpiece WP enables the obtaining of workpiece surface coordinate measurements for a plurality of measurement sample regions MSR on the surface of the workpiece WP.

In various implementations, a current measurement sample region MSR may correspond to a region that is being measured by the FPMD 110-1 at a displacement or position sensed by the sensor of the FPMD 110-1. More specifically, in the example of FIG. 1A, the current measurement sample region MSR is shown to be located below and physically contacted by the probe tip PT of the FPMD 110-1. In contrast, the current measurement sample region MSR may in various implementations not be located directly below and may not be directly sensed by the second position sensor of the SPMD 110-2, although the translation sensing along x- and y-axes by the SPMD 110-2 is related to the corresponding translation of the probe tip PT of the FPMD 110-1 along the corresponding x- and y-axes, due to the mounting arrangement 130 which fixes the position of the SPMD 110-2 relative to the position of the FPMD 110-1. As illustrated in the example of FIG. 1A, the translation that is sensed by the SPMD 110-2 may be along the surface of the workpiece, or as will be described in more detail below with respect to FIGS. 2A and 3A may in other example implementations be along a different surface (e.g., the surface of the workpiece stage 141 or another surface that the workpiece WP is or is not located on, etc.).

In various implementations, the coupling of the FPMD 110-1 and the SPMD 110-2 to the mounting device 135 may include contact activated switch to automatically activate the establishing of the inter-device communication connection and/or the initiation of the combined device operating mode of the FPMD 110-1. In various implementations, the FPMD 110-1 and the SPMD 110-2 (and/or components thereof) may automatically recognize each other and initiate an inter-device communication connection when the FPMD 110-1 and the SPMD 110-2 are placed within a specified proximity of one another. In various implementations, when two or more position measurement devices establish an inter-device communication connection or are otherwise present in a measurement system, a determination may be made as to which position measurement device will function as the FPMD. More specifically, since a standalone-capable device that is designated as the FPMD will perform the combined device operating mode, the determination as to which device will function as the FPMD may be made based at least in part on the capabilities of each of the devices. For example, if two devices are each capable of functioning as the FPMD, the determination may in some instances be made based at least in part on the display capabilities of the two devices. More specifically, if one of the devices has greater display capabilities (e.g., greater display control capability and/or display complexity or size and/or other display capabilities) for displaying a combined measurement data output (i.e., including measurement data from both devices), that device may be selected or otherwise designated to function as the FPMD of the system, while the other device may be selected or otherwise designated to function as the SPMD.

In various implementations, the FPMD 110-1 may include a first user interface 112. In one implementation shown in FIG. 1, the first user interface 112 comprises first-device control elements 113 and a first-device display 114 included in the first device housing 119-1, which may be connected to exchange signals with, and be controlled by, the first signal processing and control portion 115-1 that is housed in the first device housing 119-1. However, such an implementation is exemplary only, and not limiting. It will be appreciated that a display accessory (e.g., a smartphone, or simpler dedicated accessory) may be closely associated with an electronic measuring device, and connected to exchange signals with, and be controlled wirelessly by, the electronic measuring device (e.g., using Bluetooth or WiFi signals and appropriate dedicated software routines, according to known methods.) Such an optional implementation is illustrated in FIG. 1A, including wireless signal 112C, and the first user interface 112', which comprises first-device control elements 113' and a first-device display 114'. It will be appreciated that the first user interface 112' and its included elements may be connected to wirelessly exchange signals with, and be controlled by, the first signal processing and control portion 115-1 that is housed in the first device housing 119-1. In an implementation that uses the first user interface 112' or the like, the first user interface 112 and its associated elements may be omitted from the housing 119-1 of the FPMD 110-1.

It will be appreciated by including a first signal processing and control portion 115-1 integrated into the housing 119-1 of the FPMD 110-1, wherein the first signal processing and control portion 115-1 operates according to principles disclosed herein to manage or implement a standalone operating mode during a standalone operating period and manage or implement a combined device operating mode during a combined device operating period, including managing the operation of the first user interface 112 (112'), provides important benefits to a user/owner of the FPMD 110-1. In particular, such a device configuration considerably reduces or simplifies the hardware and/or software components, and/or the system configuration effort, required by a user in order to assemble various devices into an integrated measurement system. That is, devices heretofore optimized to provide "standalone" measurements for a workpiece, may be easily integrated to form a measurement system for providing a more complex or comprehensive combination of measurements for a workpiece, by relying on a combined device operating mode that is built into, and always available in, the FPMD. A relatively unskilled user may assemble such a system without the inconvenience, complexity and expense associated with using an additional computer or software system, if desired.

In various implementations, the first-device display 114 (or 114') may include a user interface display 122 which may in some instances display measurement sample outputs 123 (e.g., corresponding to real time measurement sample outputs) from the FPMD 110-1 and the SPMD 110-2. In the example of FIG. 1, the user interface display 122 is shown to display numerical measurement sample outputs 123-1 and 123-2 from the FPMD 110-1 and the SPMD 110-2 in display areas 122-1 and 122-2, respectively. Each of the display areas 122-1 and 122-2 also includes respective zero setting selection elements 125-1 and 125-2, which are configured to set the measurement values to zero. Such zero setting selection elements 125 may assist a user in determining relative positions when measuring a workpiece. In various implementations, during a combined device operating mode, a single zero setting selection element (e.g., selection element 125-1) may be utilized for performing a simultaneous zero setting for both the FPMD 110-1 and the SPMD 110-2. In various implementations, the first-device control elements 113 (113') may include elements such as manual control buttons 113A and 113B (113A' and 113B') on the body of the device and/or virtual buttons in a touchscreen user interface display 122, which may also include elements such as the zero setting selection elements 125-1 and 125-2, etc. In various implementations, such first-device control elements 113 (113') may be utilized for performing various functions (e.g., for toggling or scrolling between and/or selecting various options presented on the user interface display 122, such as for selecting between different measurement devices or modes, such as activating a combined device operating mode and/or activating a standalone operating mode, etc.).

In various implementations, the user interface display 122 may further include a mode selection element 127 and a measurement device selection element 128. The mode selection element 127 may be used to select a mode in which the FPMD 110-1 will operate (e.g., a standalone operating mode, a combined device operating mode, etc.), as will be described in more detail below with respect to FIG. 7. In the implementation of FIG. 1A, part of or the entirety of the user interface display 122 may be used for the mode selection element 127 by responding to a swipe gesture left or right to scroll through available modes. It will be appreciated that this example is intended to be exemplary only and not limiting, and many alternative selection structures may be utilized for the mode selection element 127, such as a drop down menu or a list box.

In various implementations, the measurement device selection element 128 may be used to select one or more measurement devices (e.g., to be utilized as part of a combined device operating mode, etc.). In some implementations, the measurement device selection element 128 may comprise an area marked "devices" which a user may hold to bring forth a device selection menu which shows measurement devices which are available (e.g., for utilization as part of a combined device operating mode, etc.). In various implementations, a selection element may be provided to enable a user to make selections with respect to the order and/or format of displayed measurement values. For example, a user may make a selection to have the user interface display 122 change an order in which measurement values are presented on the first-device display 114-1, such as changing to an order corresponding to presenting X, Y and Z values in order on one display line (e.g., similar to those illustrated in the data table 175D), as opposed to Z values on one line (for the FPMD 110-1) and X and Y values on a second line (for the SPMD 110-2).

As described above, a first position sensor of the FPMD 110-1 is configured to provide first-device measurement sample outputs 123-1 indicative of a workpiece surface coordinate measurement relative to the FPMD 110-1 along at least a first measuring axis (e.g., along the Z axis), for corresponding measurement sample regions MSR on the workpiece WP during corresponding first-device sample periods. In various implementations, the combined device operating mode includes the first signal processing and control portion 115-1, the FPMD 110-1 inputting the first-device measurement sample outputs 123-1 provided by the first position sensor and inputting second-device measurement sample outputs 123-2 provided by the SPMD 110-2 via an inter-device communication connection. Concurrent measurement data sets CMDS are determined as each including at least a first-device measurement sample output 123-1 and at least a second-device measurement sample output 123-2 corresponding to concurrent first-device and second-device sample periods. Each concurrent measurement data set CMDS is associated with a corresponding measurement sample region MSR on the workpiece WP. In various implementations, a combined measurement data output is provided for a current measurement sample region MSR on the workpiece WP based on the corresponding concurrent measurement data set CMDS.

In the example of FIG. 1A, a combined measurement data output that is provided for a current measurement sample region MSR on the workpiece WP based on a corresponding concurrent measurement data set CMDS1 corresponds to the values illustrated on the user interface display 122 of the first-device display 114-1. More specifically, a concurrent measurement data set CMDS1 may be determined as including a first-device measurement sample output 123-1 (e.g., corresponding to the displayed value of Z=9.0000) and a second-device measurement sample output 123-2 (e.g., corresponding to the displayed values of X=0.1581 and Y=0.5075) as corresponding to concurrent first-device and second-device sample periods. In the example of FIG. 1A, the concurrent first-device and second-device sample periods are determined to be close enough in timing to both correspond to and generally be represented as occurring during a "sample period 1".

In various implementations, as an alternative or in addition to the display of the combined measurement data output that is presented on the user interface display 122, the FPMD 110-1 may transmit or otherwise provide the combined measurement data output to an external device (e.g., a remote computer 180). In the example of FIG. 1A, a remote device communication connection 175 is illustrated as being established between the FPMD 110-1 and a remote computer 180. In various implementations, the inter-device communication connection and/or the remote device communication connection 175 may each comprise at least one of a wired connection, a wireless connection, a Bluetooth connection, a WiFi connection, etc. It will be appreciated that in the configuration of FIG. 1A, only a single remote device communication connection 175 is required to the remote computer 180 (e.g., in contrast to a configuration in which a different connection would be required from each of the FPMD 110-1 and the SPMD 110-2 to the remote computer 180). It will be appreciated that such a configuration with only a single remote device communication connection 175 may provide various advantages (e.g., simplifying the connection requirements and processes, etc.).

A data table 175D is illustrative of the combined measurement data output over time as provided (e.g., transmitted) from the FPMD 110-1 to the remote computer 180, and/or as presented on the user interface display 122. As shown in the data table 175D, the concurrent measurement data set CMDS1 includes a first-device measurement sample output 123-1 (e.g., corresponding to the displayed value of Z=9.0000) and a second-device measurement sample output 123-2 (e.g., corresponding to the displayed values of X=0.1581 and Y=0.5075) as corresponding to concurrent first-device and second-device sample periods (e.g., as both indicated as corresponding to a "sample period 1"). Similarly, a concurrent measurement data set CMDS2 includes a first-device measurement sample output 123-1 (e.g., corresponding to the displayed value of Z=8.0000) and a second-device measurement sample output 123-2 (e.g., corresponding to the displayed values of X=0.2000 and Y=0.5075) as corresponding to concurrent first-device and second-device sample periods (e.g., as both indicated as corresponding to a "sample period 2"). Similarly displayed are a concurrent measurement data set CMDS3 (e.g., corresponding to displayed values of X=0.3000, Y=0.5075 and Z=8.5000 as corresponding to a "sample period 3") and a concurrent measurement data set CMDS4 (e.g., corresponding to displayed values of X=0.4000, Y=0.7000 and Z=7.5000 as corresponding to a "sample period 4").

In various implementations, the determining of the concurrent measurement data sets (e.g., CMDS1-CMDS4) comprises the FPMD 110-1 triggering, via the inter-device communication connection, a concurrent second-device measurement sample output of the SPMD 110-2, at a time proximate to a concurrent first-device measurement sample output of the FPMD 110-1. In one implementation, the FPMD 110-1 may (e.g., utilizing the inter-device communication connection) trigger at the same time the concurrent second-device measurement sample output 123-2 of the SPMD 110-2, and the concurrent first-device measurement sample output 123-1 of the FPMD 110-1. In various implementations, the determining of the concurrent measurement data sets may alternatively comprise inputting a plurality of second-device measurement sample outputs 123-2 of the SPMD 110-2 via the inter-device communication connection, and selecting a second-device measurement sample output 123-2 that is closest in time to a first-device measurement sample output 123-1 of the FPMD 110-1 as its concurrent sample so as to determine a corresponding concurrent measurement data set. For example, if two second-device measurement sample outputs are input and correspond to respective times of t1=1.0001 and t2=2.0001, and a first-device measurement sample output corresponds to a time of t=2.0000, the second-device measurement sample output corresponding to the time t2=2.0001 (which is closer to the time t=2.0000) may be selected as the concurrent sample.

In contrast to the combined device operating mode, the standalone operating mode does not include the FPMD 110-1 establishing an inter-device communication connection with a second position measurement device (e.g., the SPMD 110-2). As illustrated in FIG. 1B, during the standalone operating mode of the FPMD 110-1, a standalone measurement data output 123-1' (e.g., corresponding to a value of 8.9000) is provided (e.g., in the first-device display 114-1) including a workpiece surface coordinate measurement relative to the FPMD 110-1 along at least a first measuring axis for a current measurement sample region MSR' on a workpiece WP. Similarly, as illustrated in FIG. 1C, during a standalone operating mode of the SPMD 110-2, a standalone measurement data output 123-2' (e.g., corresponding to values of 1.1581 and 0.5075) is provided (e.g., as transmitted from the SPMD 110-2) including a coordinate measurement relative to the SPMD 110-2 along at least a second measuring axis (e.g., corresponding to two measuring axes in this example). It will be appreciated that in the configurations of FIGS. 1B and 1C, the relative orientations of the measuring axes (e.g., relative to the X, Y or Z axes) may be unknown. It will be appreciated that, unlike the combined values of the data table 175D of FIG. 1A that correspond to the concurrent measurement data sets (e.g., CMDS1-CMDS4), the standalone measurement data outputs 123-1' and 123-2' may not be combinable in a similar manner (e.g., due to unknown relative orientations and positionings of the FPMD 110-1 and the SPMD 110-2 and/or unknown relative timings of when the measurement data outputs 123-1' and 123-2' are obtained relative to the positionings, etc.).

As will be described in more detail below with respect to FIG. 7, in various implementations certain calibration and/or alignment functions may be performed with respect to the orientations of the FPMD 110-1 and the SPMD 110-2. For example, calibration functions (e.g., utilizing a calibration object or other calibration techniques) may be performed to correct/calibrate corresponding measurement data outputs so as to be more accurate, etc. As another example, alignment functions may be performed with respect to the mounting arrangement 130 (e.g., including possible alignment adjustments, etc.) to ensure that the orientations (e.g., transverse orientations) of the FPMD 110-1 and the SPMD 110-2 relative to one another are as expected.

In various implementations, the standalone operating mode is a default operating mode of the FPMD 110-1 (e.g., and of the SPMD 110-2), and the first-device control elements 113 of the first user interface 112 may comprise a combined device operating mode activation element 113A, and/or the mode selection element 127 may be utilized (e.g., for activating the combined device operating mode in the signal processing and control portion 115-1 that is housed in a housing 119-1 of the FPMD 110-1) for selecting the mode, etc. In various implementations, the FPMD 110-1 and the SPMD 110-2 may each generally be characterized as standalone measurement devices that are operable to provide workpiece measurements independently of one another, and without control by a remote computer (e.g., remote computer 180), and the combined device operating mode may be activated without control by a remote computer. It will be appreciated that in various implementations the measurement system 100 may not include a remote computer 180 (e.g., wherein the combined measurement data output may only be presented on the user interface display 122, etc.).

It will be appreciated that in the example of FIGS. 1A-1C, during the standalone operating mode, the FPMD 110-1 may display only a single axis coordinate measurement on the first-device display 114-1, and during the combined device operating mode, the FPMD 110-1 may provide a combined mode output format comprising a multi-axis combined measurement data output format (e.g., including values for the X, Y and Z axes) usable when the fixed axis relationship corresponds to transverse axes. In such a configuration, the multi-axis combined measurement data output format is operable to output multiple concurrent coordinate measurements for different measurement axes (e.g., corresponding to the X, Y and Z axes) as a single output string (e.g., as sent to a remote computer 180). In such a configuration, the multi-axis combined measurement data output format may correspond to three-dimensional surface profile data corresponding to the surface of the workpiece WP. As described above, the data may be obtained by translating the workpiece WP relative to the FPMD 110-1 and the SPMD 110-2 (e.g., utilizing a measurement motion mechanism 138 or a workpiece stage motion mechanism 148), and obtaining concurrent measurement data sets (e.g., CMDS1-CMDS4) corresponding to a plurality of different measurement sample regions MSR on the surface of the workpiece WP.

FIGS. 2A-2C are diagrams of a second exemplary implementation of a dimensional metrology measurement system 200. The measurement system 200 includes the FPMD 110-1 and the SPMD 110-2, and in the example of FIG. 2A, the FPMD 110-1 operates in a combined device operating mode with the SPMD 110-2, and in the examples of FIGS. 2B and 2C, the FPMD 110-1 and the SPMD 110-2 operate in standalone operating modes, respectively. The measurement system 200 has certain similarities to the measurement system 100 of FIG. 1, and identical or similarly numbered components will be understood to operate similarly, except as otherwise described below. In general, in various diagrams herein, unless otherwise indicated by description or context, reference numbers having similar suffixes (e.g., reference number 1XX and 2XX having the suffix XX) may refer to generally analogous elements, such that operation of element 2XX may be generally understood by one of ordinary skill in the art with limited description, based on analogy to a previous description of analogous element 1XX, and so on.

With respect to certain differences from the measurement system 100, the measurement system 200 includes a mounting arrangement 230 in which the FPMD 110-1 is coupled to a first support element portion 239A and the SPMD 110-2 is coupled to a second support element portion 239B. The mounting arrangement 230 may be contrasted with the mounting arrangement 130 of the measurement system 100 in which the FPMD 110-1 and the SPMD 110-2 are more directly coupled to one another. As part of the mounting arrangement 230, the FPMD 110-1 includes a first mounting portion 131-1 for mechanically coupling to a first coupling portion 236-1 of a mounting device portion 235A. In addition, a mounting device portion 235B includes a second coupling portion 236-2 for mechanically coupling to a second mounting portion 131-2 of the SPMD 110-2.

The mounting device portion 235A further includes a third coupling portion 236-3 for coupling to the support element portion 239A (e.g., as part of a support structure or other mechanism that holds the mounting device portion 235A and the FPMD 110-1 at a position above or otherwise relative to the workpiece WP and workpiece stage configuration 140, etc.). The mounting device portion 235B further includes a fourth coupling portion 236-4 for coupling to the support element portion 239B (e.g., as part of a support structure or other mechanism that holds the mounting device portion 235B and the SPMD 110-2 at a position above or otherwise relative to the workpiece WP and workpiece stage configuration 140, etc.). In various implementations, the mounting arrangement 230 fixes the orientation of the FPMD 110-1 relative to the orientation of the SPMD 110-2 such that the first measuring axis (e.g., along the Z axis) is transverse to the second measuring axis (e.g., along the X axis or the Y axis) according to the fixed axis relationship.

In various implementations, similar to the example of FIG. 1A, the support element portions 239A and 239B may be fixed at specified locations (e.g., as part of a common support frame) such that any relative movement between the workpiece WP and the mounting arrangement 230 may be provided by operation of the workpiece stage motion mechanism 148. In various implementations, the mounting arrangement 230 may alternatively or also include one or more measurement motion mechanisms (e.g., similar to measurement motion mechanism 138 of FIG. 1A) that enables movement of the support element portions 239A and 239B for moving the mounting arrangement 230 relative to the workpiece WP (e.g., along x- and y-axes that lie in a plane that is generally parallel to the surface of the workpiece stage 141 where the workpiece WP is positioned). It will be appreciated that the movement of the mounting arrangement 230 relative to the surface of the workpiece WP enables the obtaining of workpiece surface coordinate measurements for a plurality of measurement sample regions MSR on the surface of the workpiece WP.

FIGS. 3A-3C are diagrams of a third exemplary implementation of a dimensional metrology measurement system 300. The measurement system 300 includes the FPMD 110-1 and the SPMD 110-2, and in the example of FIG. 3A, the FPMD 110-1 operates in a combined device operating mode with the SPMD 110-2, and in the examples of FIGS. 3B and 3C, the FPMD 110-1 and the SPMD 110-2 operate in standalone operating modes, respectively. The measurement system 300 has certain similarities to the measurement systems 100 and 200, and similarly numbered components will be understood to operate similarly, except as otherwise described below.

With respect to certain differences from the measurement system 100, the measurement system 300 includes a mounting arrangement 330 in which the SPMD 110-2 is generally positioned over a surface SRF (i.e., as compared to the mounting arrangement 130 of the measurement system 100 in which the SPMD 110-2 is positioned over a portion of the surface of the workpiece WP). In various implementations, the surface SRF may be representative of a surface of a stage (e.g., stage 141 of FIG. 1A), or another surface (e.g., a surface on which the workpiece WP may or may not be located). In various implementations, the surface SRF may be relatively flat and/or may have other properties that enable relatively accurate position determinations by the SPMD 110-2. For example, in an implementation where the SPMD 110-2 utilizes image correlation to determine position, the surface SRF may include features (e.g., texture, flatness, etc.) that enable accurate position determination when utilizing image correlation techniques. In certain implementations, this may be in contrast to the configuration of the measurement system 100, for which the surface of the workpiece WP may not be as amenable to accurate position determination by the SPMD 110-2. In various implementations, the mounting arrangement 330 may be larger than the mounting arrangement 130, due to the required separation of the system members so that the SPMD 110-2 remains over the surface SRF while the FPMD 110-1 remains over the surface of the workpiece WP during measurement operations.

In various implementations, as part of the mounting arrangement 330, the FPMD 110-1 includes a first mounting portion 131-1 for mechanically coupling to a first coupling portion 136-1 of a mounting device portion 335A of a mounting device 335. In various implementations, the mounting device 335 also includes a mounting device portion 335B with a second coupling portion 336-2 for mechanically coupling to a second mounting portion 131-2 of the SPMD 110-2. In the example of FIG. 1A, the mounting device 335 also includes a third mounting device portion 335C with a third coupling portion 336-3 for mechanically coupling to a third coupling portion 131-3 of the FPMD 110-1. In various implementations, the mounting device portion 335C may further include a fourth coupling portion 336-4 for coupling to a support element 139 (e.g., as part of a support structure or other mechanism that holds the mounting device 335, the FPMD 110-1 and the SPMD 110-2 at a position above or otherwise relative to the workpiece WP and surface SRF, etc.). In various implementations, the mounting device 335 may fix the orientation of the FPMD 110-1 relative to the orientation of the SPMD 110-2 such that the first measuring axis (e.g., along the Z axis) is transverse to the second measuring axis (e.g., along the X axis or the Y axis) according to the fixed axis relationship.

In various implementations, similar to the example of FIG. 1A, the surface SRF may be movable by a motion mechanism (e.g., the workpiece stage motion mechanism 148 of FIG. 1A) along x- and y-axes that lie in a plane that is generally parallel to the surface SRF where the workpiece WP is positioned. In various implementations, the mounting arrangement 330 may alternatively or also include a measurement motion mechanism (e.g., measurement motion mechanism 138 of FIG. 1A) that enables movement of the mounting arrangement 330 (e.g., along x- and y-axes that lie in a plane that is generally parallel to the surface SRF where the workpiece WP is positioned). It will be appreciated that the movement of the mounting arrangement 330 relative to the surface of the workpiece WP enables the obtaining of workpiece surface coordinate measurements for a plurality of measurement sample regions MSR on the surface of the workpiece WP.

FIGS. 4A-4C are diagrams of a fourth exemplary implementation of a dimensional metrology measurement system 400. As will be described in more detail below, the measurement system 400 includes the FPMD 110-1 and a SPMD 410-2 (e.g., an electronic caliper), and in the example of FIG. 4A, the FPMD 110-1 operates in a combined device operating mode with the SPMD 410-2, and in the examples of FIGS. 4B and 4C, the FPMD 110-1 and the SPMD 410-2 operate in standalone operating modes, respectively. The measurement system 400 has certain similarities to the measurement systems 100, 200 and 300, and similarly numbered components will be understood to operate similarly, except as otherwise described below.

With respect to certain differences from the measurement system 100, the measurement system 400 includes the SPMD 410-2 (e.g., an electronic caliper) that the FPMD 110-1 is coupled to. As illustrated in FIGS. 4A and 4C, the SPMD 410-2 includes a second-device display 414-2 as part of a readhead RH. As part of measurement operations, the readhead RH slides along a scale SC, for which a sensor (e.g., utilizing a linear transducer) within the readhead RH determines corresponding position measurement values (i.e., representative of the position of the readhead RH along the scale SC). The determined position measurement values may be displayed on the second-device display 414-2. With respect to FIG. 4C, as an example of standalone operating mode operations, a workpiece (not shown) may be placed between a measuring jaw 491 (i.e., as attached to the readhead RH) and a measuring jaw 492 (i.e., as attached to an end of the scale SC), for which a resulting measurement value may indicate an outer dimension of the workpiece that is located between the jaws 491 and 492.

As shown in FIG. 4A, the measurement system 400 includes a mounting arrangement 430 in which the FPMD 110-1 is coupled to the SPMD 410-2. As part of the mounting arrangement 430, the FPMD 110-1 includes a first mounting portion 131-1 for mechanically coupling to a second mounting portion 431-1 of the SPMD 410-2. In various implementations, the second mounting portion 431-1 may be located on or otherwise coupled to the readhead RH and/or associated measuring jaw 491, such that the FPMD 110-1 moves with the readhead RH. In such a configuration, it will be appreciated that the position of the readhead RH along the second measuring axis (i.e., the measuring axis of the SPMD 410-2) is indicative of the position of the FPMD 110-1 (i.e., and the corresponding probe tip PT) along the second measuring axis. In various implementations, a mounting device (not shown) may be utilized to assist the coupling of the FPMD 110-1 to the SPMD 410-2, and may be located between and coupled to the mounting portions 131-1 and 431-1. The FPMD 110-1 further includes a third mounting portion 131-3 for coupling to the support element 139. In various implementations, a mounting device (not shown) may be utilized to assist the coupling of the FPMD 110-1 to the support element 139, and may be located between and coupled to the mounting portion 131-3 and the support element 139.

In various implementations, the support element 139 is part of a support structure or other mechanism that holds the FPMD 110-1 and the SPMD 410-2 at a position above or otherwise relative to the workpiece WP and/or workpiece stage 141, etc.). In various implementations, the support element 139 may be fixed at a specified location wherein certain relative movement between the workpiece WP and the mounting arrangement 130 may be provided by operation of the workpiece stage motion mechanism 148. In various implementations, other or alternative movement of the FPMD 110-1 relative to the workpiece WP may be provided by the operation of the readhead RH that is slid along the scale SC of the SPMD 410-2. It will be appreciated that the movement of the FPMD 110-1 relative to the surface of the workpiece WP enables the obtaining of workpiece surface coordinate measurements for a plurality of measurement sample regions MSR on the surface of the workpiece WP.

It will be appreciated that in the example of FIG. 4A, the combined measurement data output that is provided based on the corresponding concurrent measurement data sets CMDS1-CMDS4 (e.g., represented in the data table 475D) comprises a two axis combined measurement data output usable when the fixed axis relationship corresponds to transverse axes (i.e., the first measuring axis of the FPMD 110-1 along the Z axis being transverse to the second measuring axis of the SPMD 410-2 along the X axis). In such a configuration, two-dimensional surface profile data corresponding to the workpiece surface is provided by a plurality of instances of the combined measurement data output corresponding to a plurality of different measurement sample regions on the workpiece. In contrast, during respective standalone operating modes (e.g., as illustrated in FIGS. 4B and 4C), the FPMD 110-1 and the SPMD 410-2 each display only a single axis coordinate measurement on the first-device display 114-1 and the second device display 414-2, respectively. As illustrated in FIG. 4A, during the combined device operating mode the FPMD 110-1 transmits to the remote computer 180 and/or provides a combined mode display format on the first-device display 114-1 that displays/includes two axes coordinate measurements (e.g., corresponding to X and Z axis values).

FIGS. 5A-5C are diagrams of a fifth exemplary implementation of a dimensional metrology measurement system 500. As will be described in more detail below, the measurement system 500 includes a FPMD 510-1 (e.g., a contour tracer) and the SPMD 110-2. In the example of FIG. 5A, the FPMD 510-1 operates in a combined device operating mode with the SPMD 110-2, and in the examples of FIGS. 5B and 5C, the FPMD 510-1 and the SPMD 110-2 operate in standalone operating modes, respectively. The measurement system 500 has certain similarities to the measurement systems 100, 200, 300 and 400, and similarly numbered components will be understood to operate similarly, except as otherwise described below.

With respect to certain differences from the measurement system 100, the measurement system 500 includes the FPMD 510-1 (e.g., a contour tracer) that the SPMD 110-2 is coupled to. The FPMD 510-1 includes a probe and corresponding probe tip PT' that contacts and/or otherwise moves along a surface of the workpiece WP, and a first-device display 514-1 that displays resulting measurement sample outputs 523-1. In the implementation of FIG. 5A, in addition to providing Z axis measurement sample outputs in accordance with the vertical position of the probe tip PT' as it contacts the surface of the workpiece WP, the FPMD 510-1 is also able to provide certain X axis measurement sample outputs within a limited range. More specifically, the FPMD 510-1 includes an internal movement mechanism IMM, that is able to provide movement of the probe and probe tip PT along the X axis within a limited range (e.g., as limited by the maximum movement range of the internal movement mechanism IMM within the FPMD 510-1).

In various implementations, it may be desirable to provide a measurement system that has a larger X axis measurement range than that provided by the FPMD 510-1 alone (e.g., for larger workpieces or other measurement surfaces, etc.). It will be appreciated that by coupling the SPMD 110-2 to the FPMD 510-1 and utilizing a combined device operating mode, the X axis measurement sample outputs from both the FPMD 510-1 and the SPMD 110-2 may be combined or otherwise utilized to achieve a larger X axis measurement range than that of the FPMD 510-1 alone. In the example of FIG. 5A, a concurrent measurement data set CMDS1 may be determined as including a first-device measurement sample output 523-1 (e.g., corresponding to the displayed values of X2=0.0020 and Z=9.0000) and a second-device measurement sample output 123-2 (e.g., corresponding to the displayed values of X1=0.1581 and Y=0.5075) as corresponding to concurrent first-device and second-device sample periods (e.g., as both indicated as corresponding to a "sample period 1" in the data table 575D). Similarly illustrated are a concurrent measurement data set CMDS2 (e.g., corresponding to values of X1=0.3000, Y=0.5075, Z=8.0000, X2=0.0020, X1+X2=0.2030 as corresponding to a "sample period 2"), a concurrent measurement data set CMDS3 (e.g., corresponding to values of X1=0.3000, Y=0.5075, Z=8.5000, X2=0.0040, X1+X2=0.3040 as corresponding to a "sample period 3") and a concurrent measurement data set CMDS4 (e.g., corresponding to values of X1=0.4000, Y=0.7000, Z=7.5000, X2=0.050, X1+X2=0.4050 as corresponding to a "sample period 4").

In various implementations, the first-device display 514-1 and/or data table 575D may display/include values corresponding to both X1 and X2, and may also or alternatively include values corresponding to X1+X2. For example, in an alternative implementation, during the combined device operating mode, the first-device display 514-1 may be made to display only the X1+X2 value (i.e., 0.1601 for the concurrent measurement data set CMDS1, corresponding to an overall X axis location) as opposed to displaying each of the individual X1 and X2 values. Similarly, in various implementations the data corresponding to the concurrent measurement data set CMDS1 that is transmitted by the FPMD 510-1 to the remote computer 180 may be made to include the X1+X2 value (i.e., 0.1601), which may be in addition to or as an alternative to including each of the individual X1 and X2 values.

As shown in FIG. 5A, the measurement system 500 includes a mounting arrangement 530 in which the FPMD 510-1 is coupled to the SPMD 110-2. As part of the mounting arrangement 530, the FPMD 510-1 includes a first mounting portion 531-1 for mechanically coupling to a second mounting portion 131-2 of the SPMD 110-2. In various implementations, a mounting device (not shown) may be utilized to assist the coupling of the FPMD 510-1 to the SPMD 110-2, and may be located between and coupled to the mounting portions 531-1 and 131-2. The SPMD 110-2 further includes a third mounting portion 131-3 for coupling to the support element 139. In various implementations, a mounting device (not shown) may be utilized to assist the coupling of the SPMD 110-2 to the support element 139, and may be located between and coupled to the mounting portion 131-3 and the support element 139.

In various implementations, the support element 139 is part of a support structure or other mechanism that holds the FPMD 510-1 and the SPMD 110-2 at a position above or otherwise relative to the workpiece WP and/or surface SRF' that the workpiece WP is located on, etc.). In various implementations, the support element 139 may be fixed at a specified location wherein certain relative movement between the workpiece WP and the mounting arrangement 530 may be provided by operation of a motion mechanism (e.g., the workpiece stage motion mechanism 148 of FIG. 1A). In various implementations, the mounting arrangement 530 may alternatively or also include a measurement motion mechanism (e.g., measurement motion mechanism 138 of FIG. 1A) that enables movement of the mounting arrangement 530 relative to the workpiece WP. It will be appreciated that the movement of the mounting arrangement 530 relative to the surface of the workpiece WP enables the obtaining of workpiece surface coordinate measurements for a plurality of measurement sample regions MSR on the surface of the workpiece WP.

It will be appreciated that in the example of FIG. 5A, the combined measurement data output that is provided based on the corresponding concurrent measurement data sets CMDS1-CMDS4 (e.g., represented in the data table 575D) comprises a parallel combined measurement data output usable when the fixed axis relationship corresponds to parallel axes (i.e., corresponding to the X2 values for a measuring axis of the FPMD 510-1 and the X1 values for a measuring axis of the SPMD 110-2). In such a configuration, the combined measurement data output may comprise a coordinate measurement value that is based on summing the first-device measurement sample output and the second-device measurement sample output (i.e., summing the X1 and X2 values, as indicated in the data table 575D). In various implementations, first-device control elements of a first user interface of the FPMD 510-1 may comprise a parallel axis selection element activation element that activates the use of the parallel combined measurement data output when the FPMD 510-1 is operating in the combined device operating mode.

FIG. 6 is a block diagram of a FPMD 610-1 and a SPMD 610-2 in a dimensional metrology measurement system 600. It will be appreciated that in various implementations the various components of the FPMD 610-1 and the SPMD 610-2 may be representative of various components of the respective FPMDs and SPMDs of FIGS. 1-5 as described above. As partially illustrated in some of the examples of FIGS. 1-5, in various implementations, the FPMD 610-1 may be a measurement device such as a dial indicator, a height gauge, a contour tracer, etc., and the SPMD 610-2 may be a measurement device such as a translation sensor (e.g., an image correlation sensor), a caliper, etc.

As shown in FIG. 6, the FPMD 610-1 includes a first position sensor 611-1, a first user interface 612-1, a first signal processing and control portion 615-1 and a first communication portion 618-1. The first position sensor 611-1 is configured to provide first-device measurement sample outputs indicative of a workpiece surface coordinate measurement relative to the FPMD 610-1 along at least a first measuring axis, for corresponding measurement sample regions on a workpiece during a corresponding first-device sample period. The first user interface 612-1 includes first-device control elements 613-1 and a first-device display 614-1. The first signal processing and control portion 615-1 includes a first measurement sample association portion 616-1 that is utilized to implement a combined device operating mode. In various implementations, the first signal processing and control portion 615 including the first measurement sample association portion 616 may be integrated within a housing of the FPMD 610-1. The FPMD 610-1 is configured to operate in a standalone operating mode during a standalone operating period and the combined device operating mode during a combined device operating period.

The combined device operating mode of the FPMD 610-1 may begin with an establishing of an inter-device communication connection 620 with the SPMD 610-2. In various implementations, the inter-device communication connection 620 may comprise at least one of a wired connection, a wireless connection, a Bluetooth connection, and a WiFi connection. In various implementations, the SPMD 610-2 includes a second position sensor 611-2 configured to provide second-device measurement sample outputs indicative of a workpiece surface coordinate measurement relative to the SPMD along at least a second measuring axis, for corresponding measurement sample regions on a workpiece during a corresponding second-device sample period. In various implementations, the second position sensor 611-2 may comprise a non-contact sensor, or an image correlation sensor, etc. In various implementations, the SPMD 610-2 may also include a second user interface 612-2, a second signal processing and control portion 615-2 and a second communication portion 618-2. The second user interface 612-2 may include second-device control elements 613-2 and a second-device display 614-2. The second signal processing and control portion 615-2 may include a second measurement sample association portion 616-2 that may be utilized to communicate with the first measurement sample association portion 616-1 of the FPMD 610-1 or to otherwise implement a combined device operating mode of the SPMD 610-2.

In various implementations, the combined device operating mode is usable when the FPMD 610-1 and the SPMD 610-2 are held in a fixed relationship in a workpiece measurement arrangement with the first measuring axis and the second measuring axis arranged in a fixed axis relationship (e.g., with the first measuring axis transverse to the second measuring axis, etc.). In various implementations, the combined device operating mode includes the first signal processing and control portion 615-1 inputting the first-device measurement sample outputs provided by the first position sensor 611-1 and inputting the second-device measurement sample outputs provided by the SPMD 610-2 via the inter-device communication connection 620 (e.g., as communicating between the first and second communication portions 618-1 and 618-2). As described above with respect to FIGS. 1-5, concurrent measurement data sets are determined as including at least a first-device measurement sample output and a second-device measurement sample output corresponding to concurrent first-device and second-device sample periods. Each concurrent measurement data set is associated with a corresponding measurement sample region on a workpiece that is being measured. A combined measurement data output is provided for the corresponding measurement sample regions on the workpiece based on the corresponding concurrent measurement data sets.

In various implementations, the determining of the concurrent measurement data sets during the combined device operating mode may comprise the FPMD 610-1 triggering, via the inter-device communication connection 620, a concurrent second-device measurement sample output of the SPMD 610-2, at a time proximate to a concurrent first-device measurement sample output of the FPMD 610-1. In various implementations, the FPMD 610-1 may trigger at the same time the concurrent second-device measurement sample output of the SPMD 610-2 and the concurrent first-device measurement sample output of the FPMD 610-1. In various alternative implementations, the determining of the concurrent measurement data sets may comprise inputting a plurality of second-device measurement sample outputs of the SPMD 610-2 via the inter-device communication connection, and selecting a second-device measurement sample output that is closest in time to a first-device measurement sample output of the FPMD 610-1 as its concurrent sample, so as to determine a concurrent measurement data set.

In contrast to the combined device operating mode, the standalone operating mode does not include the FPMD 610-1 establishing an inter-device communication connection with a second position measurement device (e.g., the SPMD 610-2). During the standalone operating mode, a standalone measurement data output is provided including workpiece surface coordinate measurements relative to the FPMD 610-1 along at least the first measuring axis for corresponding measurement sample regions MSR on a workpiece WP. In various implementations, the standalone operating mode is a default operating mode of the FPMD 610-1, and the first-device control elements 613-1 of the first user interface 612-1 comprise a combined device operating mode activation element. In various implementations, the FPMD 610-1 and the SPMD 610-2 are standalone measurement devices that are operable to provide workpiece measurements independently of one another, and without control by a remote computer, and the first signal processing and control portion 615-1 comprising the first measurement sample association portion 616-1 is configured to activate and implement the combined device operating mode without control from or connection to a remote computer.

Figure 7:
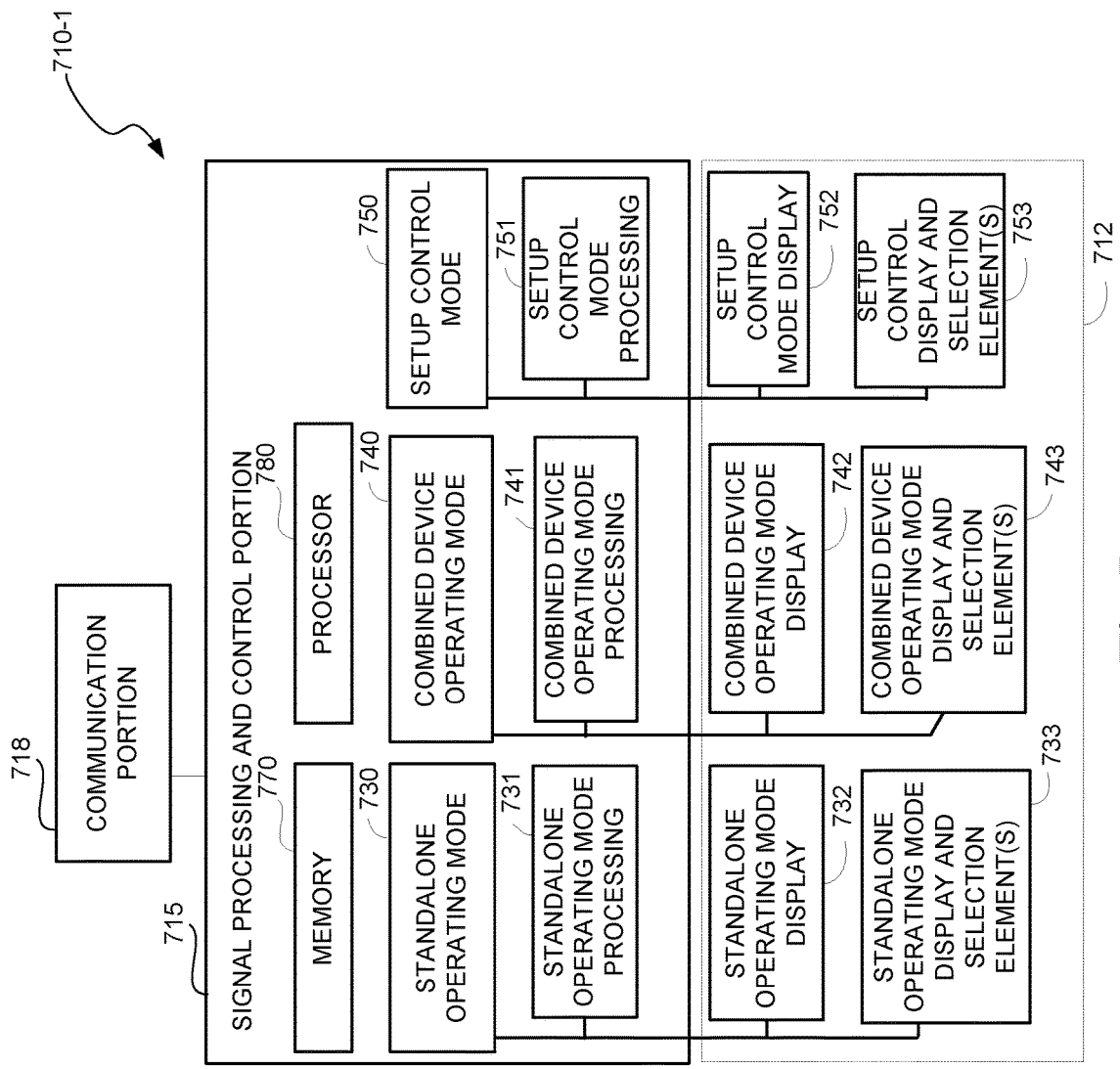
FIG. 7 is a block diagram of a user interface, a signal processing and control portion and a communication portion of a first position measurement device.

FIG. 7 is a block diagram of components of a user interface 712, a signal processing and control portion 715 and a communication portion 718 of a FPMD 710-1. It will be appreciated that in various implementations the illustrated components of the FPMD 710-1 may be representative of corresponding components of the user interfaces, signal processing and control portions, and communication portions of the respective FPMDs of FIGS. 1-6 as described above. As shown in FIG. 7, the signal processing and control portion 715 comprises a standalone operating mode 730, a combined device operating mode 740, a setup control mode 750, a memory 770, and a processor 780. The standalone operating mode 730 comprises standalone operating mode processing 731. The combined device operating mode 740 comprises combined device operating mode processing 741. The setup control mode 750 comprises setup control mode processing portion 751.

The user input interface portion 712 comprises a standalone operating mode display 732, a combined device operating mode display 742, and a setup control mode display 752. The standalone operating mode display 732 comprises standalone operating mode display and selection elements 733. The combined device operating mode display 742 comprises combined device operating mode display and selection elements 743. The setup control mode display 752 comprises setup control mode display and selection elements 753.

In various implementations, the standalone operating mode portions 730-733 may be utilized to implement the standalone operating mode (e.g., as illustrated and described above with respect to FIGS. 1B, 2B, 3B, 4B and 5B). In various implementations, the combined device operating mode portions 740-743 may be utilized to implement the combined device operating mode (e.g., as illustrated and described above with respect to FIGS. 1A, 2A, 3A, 4A and 5A). For example, the standalone operating mode processing 731 may be utilized for processing inputs from and related to the measurement sample outputs from the first position sensor of the FPMD. In contrast, the combined device operating mode processing 741 may be utilized for processing inputs from and related to both the measurement sample outputs from the first position sensor of the FPMD and as received from the SPMD via the inter-device communication connection. In various implementations, the combined device operating mode processing 741 may perform operations such as determining concurrent measurement data sets, combining measurement sample outputs (e.g., determining X1+X2 in the example of FIG. 5A), etc.

In various implementations, as part of or independent from the combined device operating mode processing 741, certain calibration and/or alignment functions may be performed with respect to the orientations of the FPMD and SPMD relative to one another. For example, alignment functions may be performed with respect to a mounting arrangement (e.g., including possible alignment adjustments, etc.) to ensure the correct orientations (e.g., transverse measuring axis orientations) of the FPMD and SPMD relative to one another. As another example, calibration functions may be performed to correct/calibrate corresponding measurement data outputs (e.g., so as to more closely correspond to transverse measuring axis orientations, etc.). In one example implementation, a calibration object with known dimensions (e.g., known step heights and dimensions) may be utilized as part of a calibration process. More specifically, after a FPMD and a SPMD are coupled together in a mounting arrangement, a calibration object may be measured by the FPMD and the SPMD as part of the combined device operating mode and the resulting measured values/dimensions may be compared to the known values/dimensions of the calibration object. Differences between the measured and known values/dimensions may be determined and stored and/or otherwise utilized for performing calibration operations (e.g., for adjusting the mounting arrangement and/or adjusting future measured values to be more accurate).

The standalone operating mode display 732 may be utilized for formatting and displaying values related to the measurement sample outputs from the first position sensor of the FPMD (e.g., as illustrated in the first-device displays 114 of FIGS. 1B, 2B, 3B, 4B and 5B). In contrast, the combined device operating mode display 742 may be utilized for formatting and displaying values related to both the measurement sample outputs from the first position sensor of the FPMD and as received from the SPMD via the inter-device communication connection (e.g., as illustrated in the first device displays 114-1 of FIGS. 1A, 1B, and 1C). In various implementations, such processing/display by the combined device operating mode display 742 may include formatting the display for displaying values related to the measurement sample outputs from both the FPMD and the SPMD, updating the display based on new values, etc.

The standalone operating mode display and selection elements 733 may be utilized for providing display and selection elements related to the operations of the FPMD and the measurement sample outputs from the first position sensor of the FPMD in the standalone operating mode (e.g., as illustrated in FIGS. 1B, 2B, 3B, 4B and 5B). In various implementations, such display and selection elements may include elements for performing a zeroing function as part of measurement operations, switching display modes (e.g., toggling between displaying measurement values in inches vs. millimeters, etc.). In contrast, the combined device operating mode display and selection elements 743 may be utilized for providing display and selection elements related to the operations of the FPMD and the measurement sample outputs from both the first position sensor of the FPMD and as received from the SPMD via the inter-device communication connection during the combined device operating mode (e.g., as illustrated in the user interface displays 122 of FIGS. 1A, 1B, and 1C). In various implementations, such display and selection elements may include first-device control elements 113 such as manual control buttons on the body of the device and/or virtual buttons in the user interface display 122, which may also include elements such as the zero setting selection elements 125-1 and 125-2, measurement device selection elements 128, etc. In various implementations, such display and selection elements may be utilized for performing various functions (e.g., for toggling or scrolling between and/or selecting various options presented on the user interface display 122, etc.). In various implementations, a user may make selections with respect to the combined device operating mode display and selection elements 743 with respect to the order and/or format of displayed measurement values. For example, a user may make a selection to have a user interface display 122 change an order in which measurement values are presented on the first-device display 114-1, such as changing to an order corresponding to presenting X, Y and Z values in order on one display line (e.g., similar to those illustrated in a data table 175D), as opposed to Z values on one line (for the FPMD) and X and Y values on a second line (for the SPMD).

In various implementations, the setup control mode portions 750-753 may be utilized for selecting between the available modes (e.g., the standalone operating mode 730, the combined device operating mode 740, etc.). For example, the setup control mode display and selection elements 753 may be utilized for providing display and selection elements related to the selection of an operating mode. In various implementations, as described above with respect to the implementation of FIG. 1A, part of or the entirety of the user interface display 122 may be used for a mode selection element 127 by responding to a swipe gesture left or right to scroll through available modes. It will be appreciated that this example is intended to be exemplary only and not limiting, and many alternative selection structures may be utilized for the mode selection element 127, such as a drop down menu or a list box, etc.

In various implementations, the setup control mode portions 750-753 may be configured such that various actions and/or events may cause the combined device operating mode to be automatically initiated, or may automatically cause an option to be presented to a user for choosing to activate the combined device operating mode or to remain in a standalone operating mode. For example, in various implementations the coupling of the FPMD and the SPMD to a mounting device, the establishment of an inter-device communication connection, or the placing of the FPMD and SPMD within a specified proximity of one another may cause the combined device operating mode to be automatically initiated or for a corresponding mode selection option to be automatically presented to a user.

The communication portion 718 may be configured to communicate with multiple types of measurement devices and other types of devices through various wireless communication means such as Bluetooth,-WiFi, cloud based data infrastructure, etc. As described above, during the combined device operating mode the communication portion 718 may be utilized for establishing an inter-device communication connection with a SPMD. The communication portion 718 may also be utilized to establish a communication connection with a remote computer.

Figure 8:
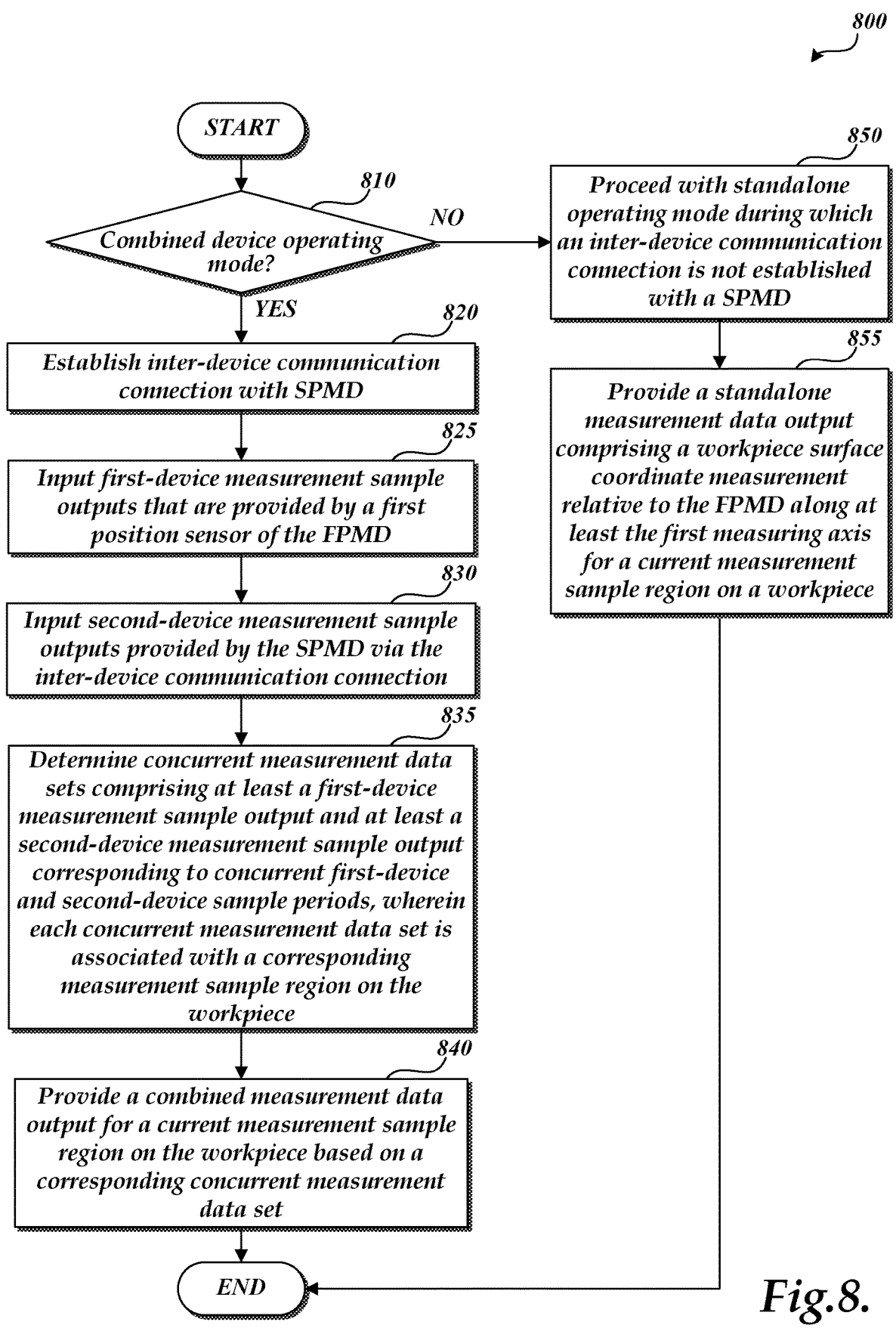
FIG. 8 is a flow diagram illustrating an exemplary implementation of a routine for operating a first position measurement device.

FIG. 8 is a flow diagram illustrating an exemplary implementation of a routine 800 for operating a FPMD. At a decision block 810, a determination is made as to whether a combined device operating mode is to be initiated. If a combined device operating mode is not to be initiated, the routine continues to a block 850, where the FPMD operates in a standalone operating mode, as will be described in more detail below. If a combined device operating mode is to be initiated, the routine continues to a block 820, where an inter-device communication connection is established with a SPMD. In various implementations, the establishment of an inter-device communication connection may occur before the determination of whether the combined device operating mode is to be initiated, and in some implementations may cause the combined device operating mode to be automatically initiated. In various implementations, the combined device operating mode may be usable when the FPMD and the SPMD are held in a fixed relationship in a workpiece measurement arrangement with at least a first measuring axis of the FPMD and at least a second measuring axis of the SPMD arranged in a fixed axis relationship.

At a block 825, first-device measurement sample outputs that are provided by a first position sensor of the FPMD are input. For example, a signal processing and control portion of the FPMD may input the measurement sample outputs from the first position sensor of the FPMD as a surface of a workpiece is measured. At a block 830, second-device measurement sample outputs provided by the SPMD are input via the inter-device communication connection. At a block 835, concurrent measurement data sets are determined, wherein each concurrent measurement data set comprises at least a first-device measurement sample output and at least a second-device measurement sample output corresponding to concurrent first-device and second-device sample periods, and each concurrent measurement data set is associated with a corresponding measurement sample region on the workpiece. At a block 840, a combined measurement data output is provided for a current measurement sample region on the workpiece based on a corresponding concurrent measurement data set.

If it is determined at the decision block 810 that a combined device operating mode is not to be initiated, the routine continues to the block 850, where the routine proceeds with the standalone operating mode, during which an inter-device communication connection is not established with a SPMD. At a block 855, a standalone measurement data output is provided comprising a workpiece surface coordinate measurement relative to the FPMD along at least the first measuring axis for a current measurement sample region on a workpiece.

Various embodiments described above can be combined to provide further embodiments. Any U.S. patents and U.S. patent applications referred to in this specification are incorporated herein by reference, in their entirety. Aspects of the embodiments can be modified, if necessary to employ concepts of the various patents and applications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

What is claimed is:

1. A first position measurement device (FPMD), comprising:
   a first position sensor housed in a first device housing and configured to provide first-device measurement sample outputs indicative of a workpiece surface coordinate measurement relative to the FPMD along a first measuring axis, for corresponding measurement sample regions on a workpiece during a corresponding first-device sample period; and
   a first signal processing and control portion housed in the first device housing comprising a first measurement sample association portion that is utilized to implement a combined device operating mode, wherein the FPMD is configured to operate in a standalone operating mode during a standalone operating period and the combined device operating mode during a combined device operating period;
   wherein:
      the combined device operating mode comprises:
         establishing an inter-device communication connection with a second position measurement device (SPMD) comprising a second position sensor configured to provide second-device measurement sample outputs indicative of a workpiece surface coordinate measurement relative to the SPMD along a second measuring axis, for corresponding measurement sample regions on a workpiece during a corresponding second-device sample period, wherein the combined device operating mode is usable when the FPMD and the SPMD are held in a fixed relationship in a workpiece measurement arrangement with the first measuring axis and the second measuring axis arranged in a fixed axis relationship;
         inputting the first-device measurement sample outputs provided by the first position sensor;
         inputting the second-device measurement sample outputs provided by the SPMD via the inter-device communication connection;
         determining concurrent measurement data sets comprising at least a first-device measurement sample output and a second-device measurement sample output corresponding to concurrent first-device and second-device sample periods, each concurrent measurement data set associated with a corresponding measurement sample region on the workpiece; and
         providing a combined measurement data output for a current measurement sample region on the workpiece based on the corresponding concurrent measurement data set; and
      the standalone operating mode comprises:
         not establishing an inter-device communication connection with a SPMD; and
         providing a standalone measurement data output comprising a workpiece surface coordinate measurement relative to the FPMD along the first measuring axis for a current measurement sample region on a workpiece.

2. The FPMD of claim 1, wherein the standalone operating mode is a default operating mode of the FPMD, and the FPMD further comprises a first user interface comprising first-device control elements including a combined device operating mode activation element.

3. The FPMD of claim 2, wherein the FPMD comprises the first user interface and a first-device display that are connected to exchange signals with the first signal processing and control portion.

4. The FPMD of claim 3, wherein the first-device control elements and the first-device display are included in the first device housing.

5. The FPMD of claim 4, wherein the FPMD comprises one of a dial indicator or a height gauge.

6. The FPMD of claim 3, wherein the first-device display is controlled by the first signal processing and control portion, and during the standalone operating mode only a single axis coordinate measurement is displayed on the first-device display, and during the combined device operating mode a combined mode display format on the first-device display displays two axis coordinate measurements.

7. The FPMD of claim 1, wherein the combined measurement data output comprises a parallel combined measurement data output usable when the fixed axis relationship corresponds to parallel axes, and the combined measurement data output comprises a coordinate measurement value that is based on summing the first-device measurement sample output and the second-device measurement sample output.

8. The FPMD of claim 7, wherein the FPMD further comprises a first user interface comprising first-device control elements including a parallel axis selection element activation element that activates the use of the parallel combined measurement data output when the FPMD is operating in the combined device operating mode.

9. The FPMD of claim 1, wherein the combined measurement data output comprises a two axis combined measurement data output usable when the fixed axis relationship corresponds to transverse axes, and the combined measurement data output comprises two coordinate measurement values corresponding to different coordinate axes.

10. The FPMD of claim 9, wherein when the fixed axis relationship corresponds to transverse axes, two-dimensional surface profile data corresponding to the workpiece surface is provided by a plurality of instances of the combined measurement data output corresponding to a plurality of different measurement sample regions on the workpiece.

11. The FPMD of claim 1, wherein the inter-device communication connection comprises at least one of a wired connection, a wireless connection, a Bluetooth connection, or a WiFi connection.

12. The FPMD of claim 1, wherein the determining of the concurrent measurement data sets comprises the FPMD triggering, via the inter-device communication connection, a concurrent second-device measurement sample output of the SPMD, at a time proximate to a concurrent first-device measurement sample output of the FPMD.

13. The FPMD of claim 12, wherein the FPMD triggers at the same time:
the concurrent second-device measurement sample output of the SPMD; and
the concurrent first-device measurement sample output of the FPMD.

14. The FPMD of claim 1, wherein the determining of the concurrent measurement data sets comprises inputting a plurality of second-device measurement sample outputs of the SPMD via the inter-device communication connection, and selecting a second-device measurement sample output that is closest in time to a first-device measurement sample output of the FPMD as its concurrent sample so as to determine a concurrent measurement data set.

15. The FPMD of claim 1, wherein the FPMD and the SPMD are standalone measurement devices that are operable to provide workpiece measurements independently of one another, and without control by a remote computer, and the first signal processing and control portion comprising the first measurement sample association portion is configured to activate the combined device operating mode without control by a remote computer.

16. The FPMD of claim 15, wherein during the standalone operating mode the first signal processing and control portion provides a standalone mode output format comprising a single axis measurement data output format operable to output a single axis coordinate measurement as a single output string sent to a remote computer, and during the combined device operating mode the first signal processing and control portion provides a combined mode output format comprising a two axis combined measurement data output format usable when the fixed axis relationship corresponds to transverse axes, and the two axis combined measurement data output format is operable to output two concurrent coordinate measurements for different measurement axes as a single output string sent to a remote computer.

17. A method for operating a dimensional metrology measurement system including system members, comprising:
a first position measurement device (FPMD), comprising:
a first position sensor housed in a first device housing and configured to provide first-device measurement sample outputs indicative of a workpiece surface coordinate measurement relative to the FPMD along a first measuring axis, for corresponding measurement sample regions on a workpiece during a corresponding first-device sample period;
a first signal processing and control portion housed in the first device housing and comprising a first measurement sample association portion that is utilized to implement a combined device operating mode, wherein the FPMD is configured to operate in a standalone operating mode during a standalone operating period and the combined device operating mode during a combined device operating period;
wherein:
the combined device operating mode comprises:
a) establishing an inter-device communication connection with a second position measurement device (SPMD) comprising a second position sensor configured to provide second-device measurement sample outputs indicative of a workpiece surface coordinate measurement relative to the SPMD along a second measuring axis, for corresponding measurement sample regions on a workpiece during a corresponding second-device sample period, wherein the combined device operating mode is usable when the FPMD and the SPMD are held in a fixed relationship in a workpiece measurement arrangement with the first measuring axis and the second measuring axis arranged in a fixed axis relationship;
b) inputting the first-device measurement sample outputs provided by the first position sensor;
c) inputting the second-device measurement sample outputs provided by the SPMD via the inter-device communication connection;
d) determining concurrent measurement data sets comprising a first-device measurement sample output and a second-device measurement sample output corresponding to concurrent first-device and second-device sample periods, each concurrent measurement data set associated with a corresponding measurement sample region on the workpiece; and
e) providing a combined measurement data output for the current measurement sample region on the workpiece based on the corresponding concurrent measurement data set; and the standalone operating mode comprises:
f) not establishing an inter-device communication connection with a SPMD; and
g) providing a standalone measurement data output comprising a workpiece surface coordinate measurement relative to the FPMD along the first measuring axis for a current measurement sample region on a workpiece, and the method comprising:
mounting the FPMD and the SPMD using a mounting arrangement to hold the FPMD in a fixed relationship relative to the SPMD, with the first measuring axis and the second measuring axis arranged in the fixed axis relationship;
arranging the FPMD the SPMD and the mounting arrangement relative to the workpiece in the workpiece measurement arrangement that is operable to provide workpiece surface coordinate measurements for a plurality of measurement sample regions on the workpiece;
operating the first signal processing and control portion comprising the first measurement sample association portion to activate the combined device operating mode; and
operating the first signal processing and control portion comprising the first measurement sample association portion to perform the operations a) through e) of the combined device operating mode.

18. The method of claim 17, wherein the second position sensor comprises at least one of a non-contact sensor and an image correlation sensor.

19. The method of claim 17, wherein the step of operating the first signal processing and control portion comprising the first measurement sample association portion to activate the combined device operating mode does not include using a remote computer to activate the combined device operating mode.

20. The method of claim 19, wherein the system members do not include a remote computer.

21. The method of claim 17, wherein the fixed axis relationship is a transverse axis relationship, and the method further comprises providing two-dimensional surface profile data corresponding to the workpiece surface by translating the workpiece relative to the FPMD and the SPMD, and operating the first signal processing and control portion comprising the first measurement sample association portion to perform operations b) through e) a plurality of times corresponding to a plurality of different measurement sample regions on the workpiece.

22. A method for operating a first position measurement device (FPMD),
the FPMD comprising:
a first position sensor housed in a first device housing and configured to provide first-device measurement sample outputs indicative of a workpiece surface coordinate measurement relative to the FPMD along a first measuring axis, for corresponding measurement sample regions on a workpiece during a corresponding first-device sample period;
a first signal processing and control portion housed in the first device housing and comprising a first measurement sample association portion that is utilized to implement a combined device operating mode, wherein the FPMD is configured to operate in a standalone operating mode during a standalone operating period and the combined device operating mode during a combined device operating period; and the method comprising:
operating the first signal processing and control portion to perform the combined device operating mode during a combined device operating period, the combined device operating mode comprising:
establishing an inter-device communication connection with a second position measurement device (SPMD) comprising a second position sensor configured to provide second-device measurement sample outputs indicative of a workpiece surface coordinate measurement relative to the SPMD along a second measuring axis, for corresponding measurement sample regions on a workpiece during a corresponding second-device sample period, wherein the combined device operating mode is usable when the FPMD and the SPMD are held in a fixed relationship in a workpiece measurement arrangement with the first measuring axis and the second measuring axis arranged in a fixed axis relationship;
inputting the first-device measurement sample outputs provided by the first position sensor;
inputting the second-device measurement sample outputs provided by the SPMD via the inter-device communication connection;
determining concurrent measurement data sets comprising a first-device measurement sample output and a second-device measurement sample output corresponding to concurrent first-device and second-device sample periods, each concurrent measurement data set associated with a corresponding measurement sample region on the workpiece; and
providing a combined measurement data output for the current measurement sample region on the workpiece based on the corresponding concurrent measurement data set; and
operating the first signal processing and control portion to perform the standalone operating mode during a standalone operating period, the standalone operating mode comprising:
not establishing an inter-device communication connection with a SPMD; and
providing a standalone measurement data output comprising a workpiece surface coordinate measurement relative to the FPMD along the first measuring axis for a current measurement sample region on a workpiece.

* * * * *